United States Patent
Gammon

(10) Patent No.: US 9,591,032 B2
(45) Date of Patent: Mar. 7, 2017

(54) SYSTEM AND METHOD FOR BROADCASTING CAPTIONS

(75) Inventor: Scott Gammon, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/634,810

(22) PCT Filed: Jul. 28, 2011

(86) PCT No.: PCT/CA2011/000868
§ 371 (c)(1),
(2), (4) Date: Sep. 13, 2013

(87) PCT Pub. No.: WO2013/013284
PCT Pub. Date: Jan. 31, 2013

(65) Prior Publication Data
US 2014/0156271 A1      Jun. 5, 2014

(51) Int. Cl.
*H04W 4/06*     (2009.01)
*H04L 29/06*    (2006.01)
(Continued)

(52) U.S. Cl.
CPC ........ *H04L 65/1006* (2013.01); *G10L 15/265* (2013.01); *H04H 60/02* (2013.01);
(Continued)

(58) Field of Classification Search
CPC ......... H04N 21/4788; H04N 21/41407; H04N 21/233; H04N 21/235; H04N 21/440236;
(Continued)

(56) References Cited

U.S. PATENT DOCUMENTS 6,785,539 B2    8/2004    Hale et al.
7,221,405 B2 *  5/2007    Basson ............... G09B 19/08
                                                    345/7
(Continued)

FOREIGN PATENT DOCUMENTS

CA        2127925         8/1994
CN      101379793 A      12/2006
(Continued)

OTHER PUBLICATIONS

European Patent Office, Extended European Search Report, Application No. PCT/CA2011/000868, Feb. 25, 2015.
(Continued)

*Primary Examiner* — Pankaj Kumar
*Assistant Examiner* — Alexander Boyd
(74) *Attorney, Agent, or Firm* — Moffat & Co.

(57) ABSTRACT

There is disclosed one or more methods, systems and components therefor for broadcasting captions of a presenter's speech to audience members to accompany the live viewing of the presentation. A host captioning device converts the presenter's speech to text and communicates the text to and for presentation by an audience member's client device. The communication session between the host captioning device and the client device is established by an invitation request from the host captioning device in response to a registration request from the client device. The captioning information may be communicated in real time as text. The host captioning device either connects to a network or provides one itself, thereby serving as an access point for the client devices.

18 Claims, 3 Drawing Sheets

(51) Int. Cl.

| | | |
|---|---|---|
| *H04H 60/02* | (2008.01) | |
| *H04H 60/92* | (2008.01) | |
| *H04L 12/12* | (2006.01) | |
| *H04N 21/233* | (2011.01) | |
| *H04N 21/235* | (2011.01) | |
| *H04W 4/00* | (2009.01) | |
| *H04W 80/10* | (2009.01) | |
| *H04L 12/18* | (2006.01) | |
| *H04N 21/414* | (2011.01) | |
| *H04N 21/422* | (2011.01) | |
| *H04N 21/4402* | (2011.01) | |
| *H04N 21/4788* | (2011.01) | |
| *H04N 21/488* | (2011.01) | |
| *H04N 21/643* | (2011.01) | |
| *G10L 15/26* | (2006.01) | |

(52) U.S. Cl.
CPC ............ *H04H 60/92* (2013.01); *H04L 12/12* (2013.01); *H04L 12/18* (2013.01); *H04L 12/1822* (2013.01); *H04L 65/00* (2013.01); *H04L 65/1069* (2013.01); *H04L 65/1083* (2013.01); *H04L 65/80* (2013.01); *H04N 21/233* (2013.01); *H04N 21/235* (2013.01); *H04N 21/41407* (2013.01); *H04N 21/42203* (2013.01); *H04N 21/440236* (2013.01); *H04N 21/4788* (2013.01); *H04N 21/4884* (2013.01); *H04N 21/64322* (2013.01); *H04W 4/00* (2013.01); *H04W 80/10* (2013.01); *H04W 4/06* (2013.01); *Y02B 60/34* (2013.01)

(58) Field of Classification Search
CPC .......... H04N 21/4884; H04N 21/64322; G10L 15/26; H04L 65/1083
See application file for complete search history.

(56) References Cited

U.S. PATENT DOCUMENTS

| | | | |
|---|---|---|---|
| 7,421,477 | B2 | 9/2008 | Pettinato |
| 7,844,684 | B2 | 11/2010 | Pettinato |
| 2002/0184373 | A1* | 12/2002 | Maes ............................ 709/228 |
| 2005/0021616 | A1* | 1/2005 | Rajahalme et al. ........... 709/204 |
| 2005/0227614 | A1 | 10/2005 | Hosking et al. |
| 2006/0072523 | A1* | 4/2006 | Richardson ......... H04L 65/1073 370/338 |
| 2007/0106724 | A1* | 5/2007 | Gorti et al. ................... 709/204 |
| 2007/0180485 | A1* | 8/2007 | Dua .............................. 725/114 |
| 2008/0240391 | A1* | 10/2008 | Nishide ..................... 379/202.01 |
| 2008/0293443 | A1 | 11/2008 | Pettinato |
| 2009/0270048 | A1 | 10/2009 | Wolff |
| 2010/0111101 | A1* | 5/2010 | McKee et al. ................. 370/466 |
| 2010/0158231 | A1* | 6/2010 | Newberg ................ H04W 4/08 379/202.01 |
| 2010/0195610 | A1 | 8/2010 | Zhong et al. |
| 2011/0035218 | A1 | 2/2011 | Pettinato |
| 2012/0059651 | A1* | 3/2012 | Delgado ............... H04W 4/008 704/235 |
| 2012/0182384 | A1* | 7/2012 | Anderson ........... H04L 65/1083 348/14.09 |

FOREIGN PATENT DOCUMENTS

| | | |
|---|---|---|
| WO | 2007070435 A2 | 6/2007 |
| WO | 2008098247 A2 | 8/2008 |
| WO | 2010034328 | 4/2010 |
| WO | 2010059120 A1 | 5/2010 |

OTHER PUBLICATIONS

RFC 5194; van Wijk & Gybels; Framework for Real-Time Text over IP Using the Session Initiation Protocol (SIP); Jun. 2008.
RFC 3261; SIP: Session Initiation Protocol; Rosenberg, et al.; Jun. 2012.
RFC 5373; Requesting Answering Modes for the Session Initiation Protocol (SIP); Willis & Allen; Nov. 2008.
Canadian Intellectual Property Office, Office Action, Application No. 2843020, Apr. 28, 2015.
Canadian Intellectual Property Office, Office Action, Application No. 2843020, Mar. 15, 2016.
State Intellectual Property Office of the Peoples Republic of China, Office Action on Application No. 201180073735.1, Issued on Jul. 4, 2016.

* cited by examiner

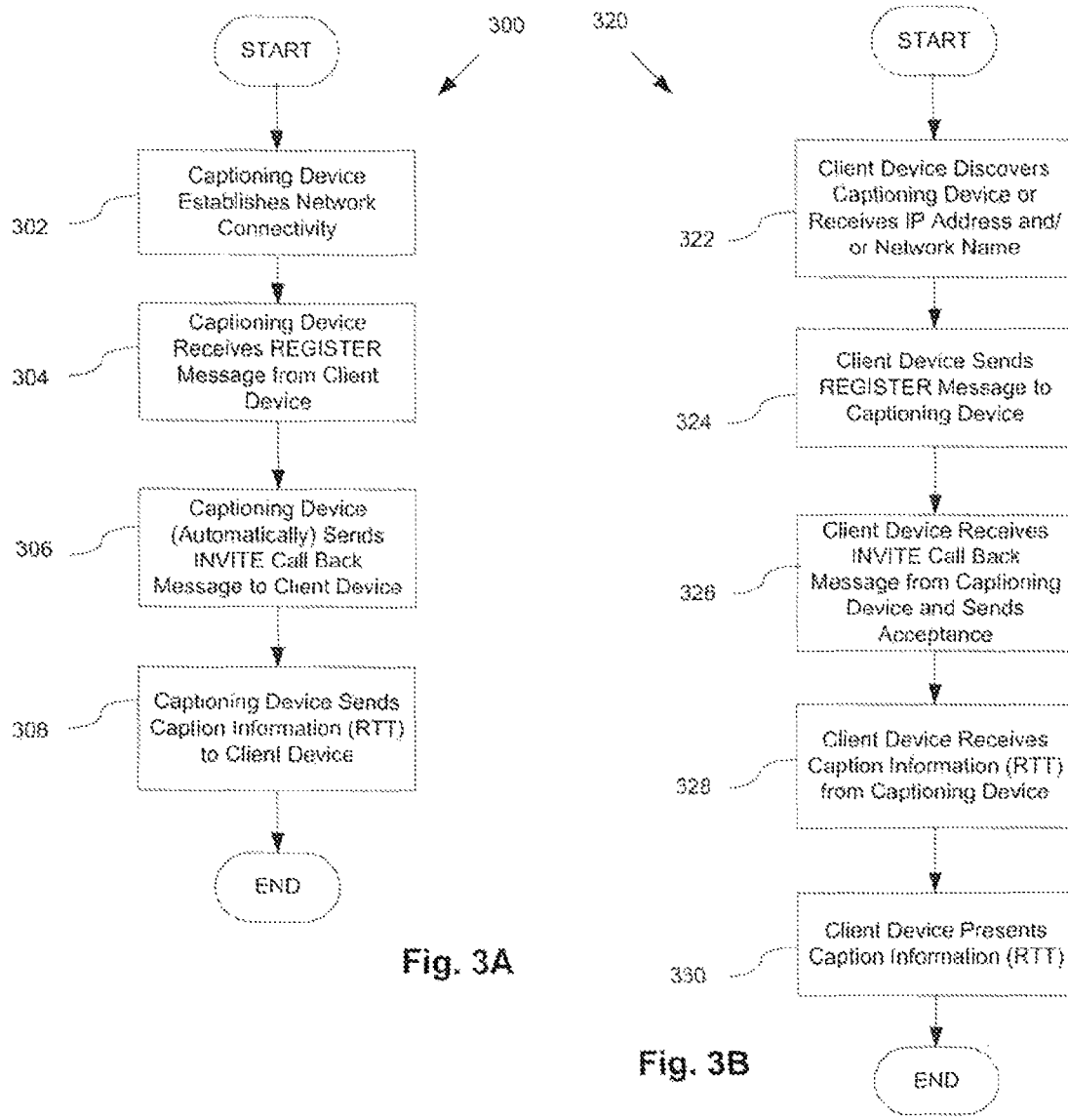

SYSTEM AND METHOD FOR BROADCASTING CAPTIONS

FIELD

The present disclosure relates to a system and method for broadcasting captions and is particularly concerned with providing captions for live presentations.

BACKGROUND

Audience members often have difficulty with following the audio portion of a live presentation. This may be due to hearing impairments, but can also arise in a variety of situations, for example, in environments where noise levels are high, such as in gymnasiums. Captioning provides these audience members with the benefit of a textual representation of the presentation.

BRIEF DESCRIPTION OF THE DRAWINGS

In order that the subject matter may be readily understood, embodiments are illustrated by way of examples in the accompanying drawings, in which:

FIG. 3A and FIG. 3B are respective flowcharts showing methods for communicating a presenter's live speech to audience members using the captioning device and the client device of FIGS. 2A and 2B.

For convenience, like numerals in the description refer to like structures in the drawings.

DETAILED DESCRIPTION

There is disclosed one or more methods, systems and components therefor for broadcasting captions of a live presentation to audience members. A host captioning device, such as a handheld mobile device, a tablet or a laptop, either connects to a network or provides one itself, thereby serving as an access point for audience members' client devices, such as mobile handheld devices. The host captioning device converts the presenter's speech to text and communicates the text to the client device in real time. The communication session between the host device and the client device is established by an invitation request from the host captioning device in response to a registration request from the client device.

According to an example embodiment, disclosed is a method of communicating caption information for presentation by a client device, the method including sending an invitation to the client device for establishing a communication session in response to a registration message received from the client device. The receipt of the caption information by the client device is in real time.

According to another example embodiment, the Session Initiation Protocol (SIP) standard may be used to provide session control. The method may further include sending a SIP INVITE request to the client device for establishing a SIP session in response to a SIP REGISTER request received from the client device, and sending the caption information to the client device using Real-Time Transport Protocol (RTP).

The method may further include receiving an audio signal representing the speech of a live presentation and converting the audio signal to text for sending to the client device.

According to another aspect, there is disclosed a computing device having a processor and memory, the memory storing instructions and data for execution by the processor to configure the computing device to perform the method aspect.

Figure 1:
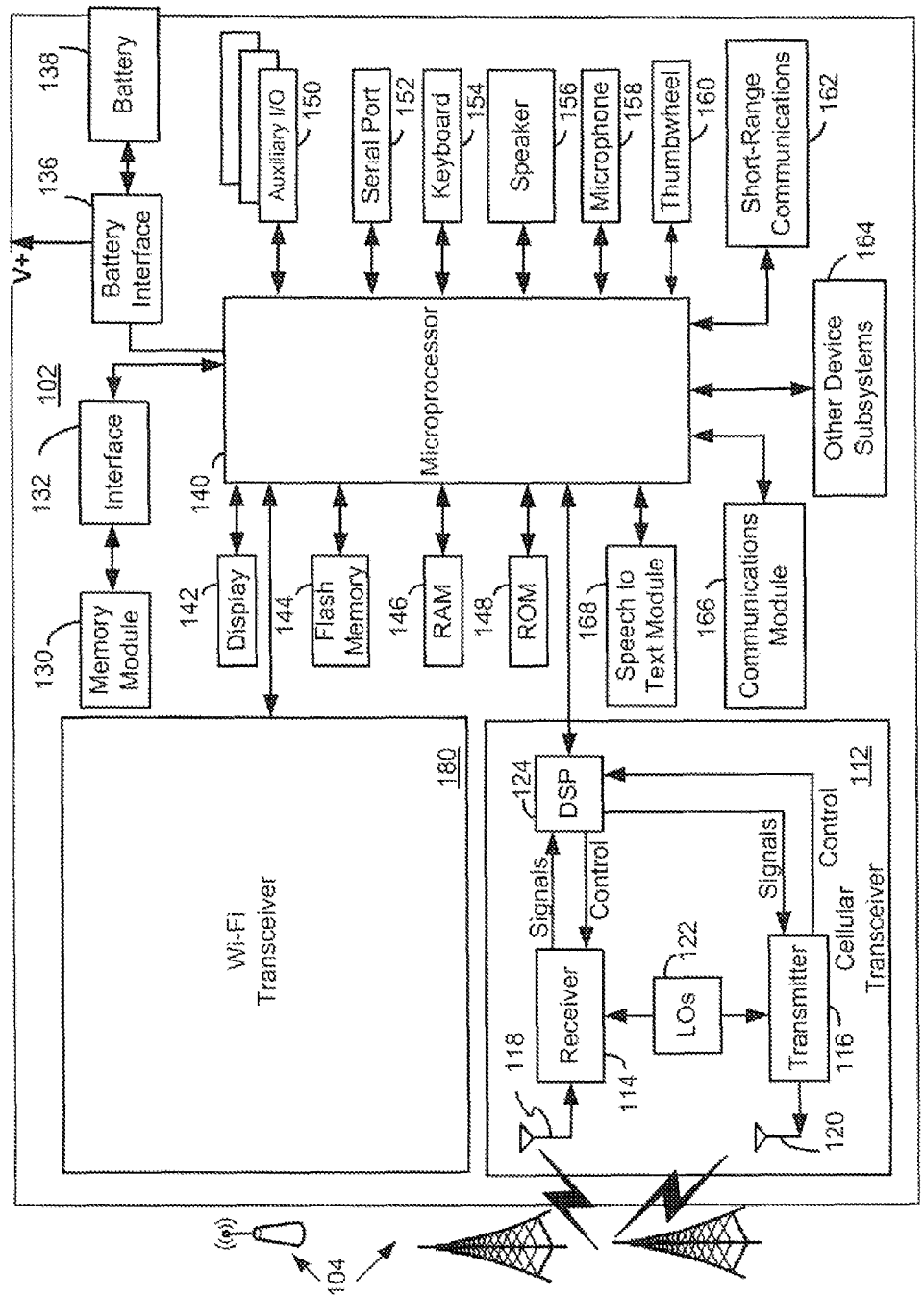
FIG. 1 is a block diagram illustrating components of a communication device according to one example embodiment.
Figure 2A:
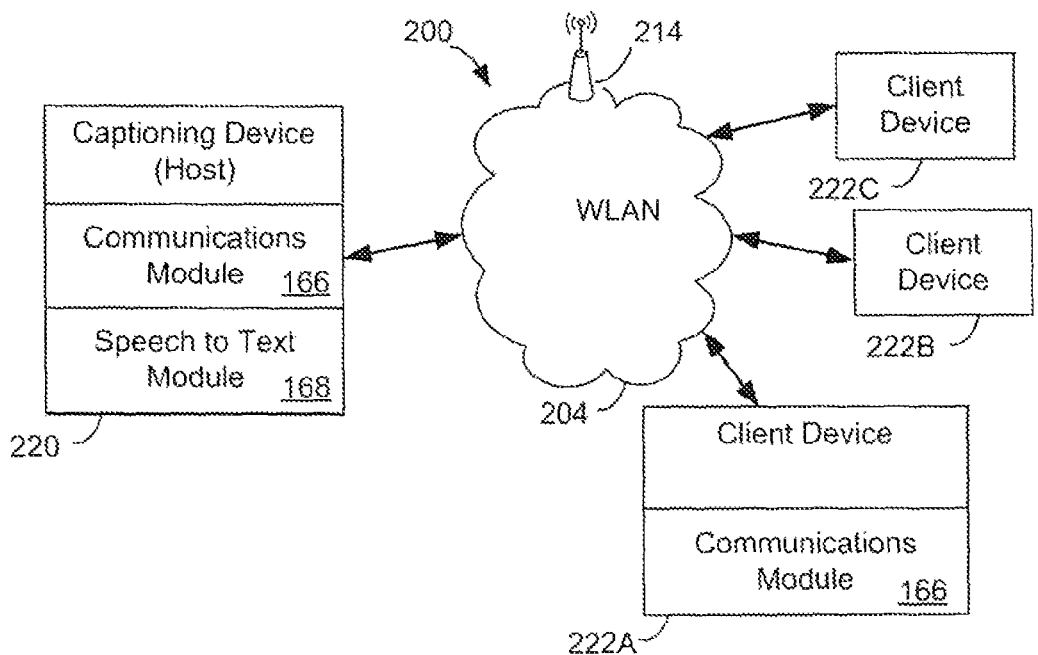
FIG. 2A and FIG. 2B are respective block diagrams illustrating a communication system according to one example embodiment including a captioning device and a client device based on the device of FIG. 1.

Reference is first made to FIG. 1, which shows a block diagram illustrating an electronic communication device 102 that is suitable for receiving audio and communicating caption information in a host or originating mode in accordance with one aspect of the present disclosure. It will be further understood that device 102 is suitable to receive and display or otherwise present the caption information in a client mode in accordance with one aspect of the present disclosure. Device 102 is illustrated with wireless communication capabilities and in particular example embodiments communicates through a communication network 104. Network 104 is also illustrated with wireless capabilities and includes antenna, base stations, and supporting radio equipment for supporting wireless communications between device 102 and other devices connected to network 104. Network 104 may be coupled to a network gateway and to a wide area network, (e.g. as shown in FIG. 2A).

In one example embodiment, device 102 is a two-way communication device having at least data and/or voice communication capabilities, including the capability to communicate with other computer systems. In particular example embodiments, device 102 is a mobile device. Depending on the functionality provided by device 102, it may be referred to as a data messaging device, a two-way pager, a cellular telephone with data messaging capabilities, a wireless Internet appliance, a data communication device (with or without telephony capabilities), a smart phone, personal digital assistant, a portable media, a music player, a tablet or a laptop. In some example embodiments device 102 is a desktop computer or a server. More generically, it may be referenced as a computing device.

Device 102 may communicate with any one of a plurality of fixed transceiver stations within its geographic coverage area. Though a wireless device is shown, in some example embodiments device 102 may have a wire connection to network 104.

Device 102 may incorporate one or more communication subsystems 112 and 180. Communication subsystem 112 includes a receiver 114, a transmitter 116, and associated components, such as one or more antenna elements (118 and 120), local oscillators (LOs) 122, and a processing module such as a digital signal processor (DSP) 124. In one embodiment, antenna elements (118 and 120) may be embedded or internal to device 102. As will be apparent to those skilled in the field of communications, the particular design of the communication subsystem 112 depends on the network 104 in which device 102 is intended to operate.

Device 102 may send and receive communication signals over the network 104 after network registration or activation procedures have been completed. Signals received (e.g. by antenna elements 118) through network 104 are input to receiver 114, which may perform such common receiver functions as signal amplification, frequency down conversion, filtering, channel selection, etc., as well as analog-to-digital (ND) conversion. ND conversion of a received signal allows more complex communication functions such as demodulation and decoding to be performed in DSP 124. In a similar manner, signals to be transmitted are processed, including modulation and encoding, for example, by DSP 124. These DSP-processed signals are input to transmitter 116 for digital-to-analog (D/A) conversion, frequency up conversion, filtering, amplification, and transmission to the network 104 via antenna 120. DSP 124 processes communication signals and provides for receiver and transmitter control. For example, the gains applied to communication signals in receiver 114 and transmitter 116 may be adaptively controlled through automatic gain control algorithms implemented in DSP 124.

Network access (WAN) may be associated with a subscriber or user of device 102 via a memory module, such as a memory module 130, which may be a Subscriber Identity Module (SIM) card for use in a GSM network or a USIM card for use in a UMTS. The SIM card is inserted in or connected to an interface 132 of device 102 in order to operate in conjunction with network 104. Alternatively, device 102 may have an integrated identity module for use with systems such as Code Division Multiple Access (CDMA) systems. Device 102 may include a Wi-Fi transceiver 180 that may include similar components/chipsets to communication subsystem 112 adapted for one or more Wi-Fi protocols. Though Wi-Fi is shown, WiMAX is one alternative transceiver. In some example embodiments, device 102 may be capable of Wi-Fi and WiMAX communications in accordance with software-defined radio ("cognizant radio") techniques.

Device 102 also includes a battery interface 136 for receiving one or more battery 138 which may be rechargeable. The one or more battery 138 provides electrical power to at least some of the electrical circuitry in device 102, and battery interface 136 provides a mechanical and electrical connection for the one or more battery 138. Battery interface 136 is coupled to a regulator (not shown) which provides power V+ to the circuitry of device 102.

Device 102 includes a programmable processor (e.g. microprocessor 140) which controls the overall operation of device 102. Communication functions, including at least data and voice communications, are performed through the communication subsystem 112. Microprocessor 140 also interacts with additional device subsystems such as a display 142, a flash memory 144, a random access memory (e.g. RAM 146), a read-only memory (e.g. ROM 148), auxiliary input/output (I/O) subsystems 150 (e.g. an audio port for connecting to a set of headphones and/or a remote microphone (not shown)), a serial port 152 (e.g. Universal Serial Bus (USB)), a keyboard or keypad 154, a speaker 156, a microphone 158, a clickable thumbwheel, trackball, optical or other touch or gesture based input pad, or set of scroll buttons, etc. 160, typically for scrolling/selecting input, a short-range communications subsystem 162, and any other device subsystems generally designated as 164. Some of the subsystems shown in FIG. 1 perform communication-related functions, whereas other subsystems may provide "resident" or on-device functions.

Some subsystems, such as keypad 154, display 142, and input device 160, for example, may be used for communication-related functions, such as entering a text message for transmission over network 104, and executing device-resident functions such as a calculator or task list. Operating system software used by the microprocessor 140 is preferably stored in a persistent store such as flash memory 144, which may alternatively be ROM 148 or similar storage element. Those skilled in the art will appreciate that the operating system, specific device applications, or parts thereof, may be temporarily loaded into a volatile store such as RAM 146.

The microprocessor 140, in addition to its operating system functions, enables execution of software applications on device 102. A predetermined set of applications that control basic device operations, including data and voice communication applications, will normally be installed on device 102 during or after manufacture. One or more memory stores may be available on device 102 to facilitate storage of information, such as flash memory 144, RAM 146, ROM 148, memory module 130, or other types of memory storage devices or FLASH memory cards represented by other device subsystems 164, such as Secure Digital (SD) cards, mini SD cards, micro SD cards, etc.

Device 102 may be configured with a browser for interacting with Web pages. Device 102 may have one or more media related applications for displaying images, playing audio and or video files/streams, etc. The browser and/or media applications often have the ability to send and receive data items via either network 104 or a link to a computer system. The link to the computer system may be via serial port 152 or short-range communications subsystem 162. Additional applications may also be loaded onto device 102 through network 104, auxiliary I/O subsystem 150, serial port 152, short-range communications subsystem 162, or possibly, other device subsystems 164, and installed by a user in RAM 146 or a non-volatile store such as ROM 148 for execution by microprocessor 140. Such flexibility in application installation increases the functionality of device 102 and may provide enhanced on-device functions, communication-related functions, or both. For example, secure communication applications may enable electronic commerce functions and other such financial transactions to be performed using device 102.

A data signal representing caption information such as text data may be received or transmitted by communication subsystem 112, transceiver 180 or short range communications 162. The microprocessor 140 will further process a received data signal for output to display 142 or alternatively to auxiliary I/O subsystem 150. A user of device 102 may also compose data items, such as an Internet Protocol (IP) address, for example, using keypad 154 and/or input device 160 in conjunction with display 142 and possibly auxiliary I/O subsystem 150. Keypad 154 may be either a complete alphanumeric keypad or telephone-type keypad.

Device 102 receives audio signals through the audio port 150 or microphone 158 and signals for transcription would be generated by a transducer such as microphone 158.

Serial port 152 is often implemented (e.g. in a personal digital assistant (PDA) type communication device for which synchronization or other communication with a user's computer is a desirable, albeit optional, component). Serial port 152 enables a user to set preferences through an external device or software application and extends the capabilities of device 102 by providing for information, media file, or software downloads to or uploads from device 102 other than through network 104.

Short-range communications subsystem 162 is an additional optional component which provides for communication between device 102 and different systems or devices, which need not necessarily be similar devices. For example, short-range communications subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another example embodiment, short-range communications subsystem 162 may be a wireless networking communications subsystem, conforming to IEEE 802.11 standards such as 802.11b, 802.11g, and/or 802.11n.

In a further example embodiment, device 102 may be configured to operate as an access point to establish a wireless local area network for communication with other wireless devices such as other devices 102 as described further herein below.

Communications module 166 is an additional component that provides for establishing, managing, and terminating sessions between device 102 and different systems or devices, which need not necessarily be similar devices.

In a host mode, communications module 166 may be configured to receive requests from client devices to initiate transmission of caption information to the clients. In a client device, communications module 166 may be configured to transmit such requests to a host. The respective communications modules may be configured to conduct the conversation, typically in a point to multipoint fashion such that a host device is communicating caption information to one or more clients but not receiving text from same. The client devices are muted for example.

Communications module 166 may be further configured to communicate caption information between device 102 and different systems or devices (e.g. other devices 102) in real time. In some example embodiments, communications module 166 may be configured to communicate caption information using Real Time Text (RTT). RTT communicates text on a character by character basis in real time to provide a conversational experience. Such conversations are typically bi-directional between two communicating parties (or tri-directional among three parties, etc.). In a live captioning scenario, a uni-directional conversation from a host device to one or more receiving devices (point to multipoint) may be preferred.

Communications module 166 may be further configured for terminating the communication session between the host and one or more client devices (e.g. at the end of a presentation or in response to a respective client terminating the session).

In some example embodiments, the Session Initiation Protocol (SIP) standard may be used to provide session control. SIP is an application-layer control (signaling) protocol primarily set out in the RFC 3261 standard and known for use in multimedia and Internet telephone (voice) applications (e.g. Voice Over IP (Vol P)). SIP is useful as a signaling standard because it can control communications sessions between applications, independent of media type or the function they perform. As a peer-to-peer protocol, a further benefit is that there is no centralized component. Aside from the routing of SIP messages, the logic involved in SIP-enabled applications is distributed to endpoints.

Communications module 166 for a host device may be further configured to include a registrar server. A SIP network architecture often includes a registrar server to identify the location of endpoints. An endpoint may register itself by sending a REGISTER request to a registrar server to inform the registrar server of the location of the endpoint. In a typical VoIP scenario, a SIP phone is configured to automatically register itself when conditions permit. In a live captioning scenario, it may be preferable for a client device to register itself with a host device selectively, such as in response to a user initiated action.

Communications module 166 for a host device may be further configured to send a request to a client device, inviting it to a session. In a SIP-enabled application, the invitation may in the form of a SIP INVITE request that the client endpoint join in a call with the host endpoint.

Persons of ordinary skill in the art will appreciate that the SIP communications model is based on IP and is often used along with other protocols and services, including Real-Time Transport Protocol (RTP) and Session Description Protocol (SDP). RTP may be used for transmission of real-time data including text (e.g. captioning information). SDP may be used to exchange information about SIP endpoint capabilities and negotiate call features.

Speech to text module 168 provides for converting an audio signal representing speech (e.g. live speech in a performance) to text in real time. Although not shown, a translation module may also be configured to translate the text generated by the speech to text module 170 into a different language. Communications module 166 may be configured to receive the possibly translated text.

Figure 2B:
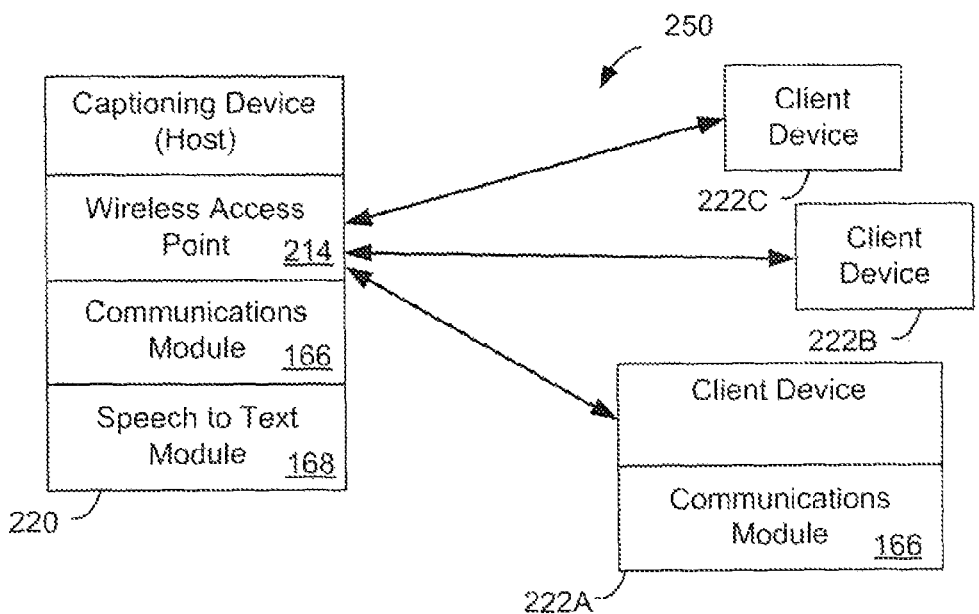

Reference is next made to FIGS. 2A and 2B, which show communication systems 200 and 250 for communicating captioning information in accordance with respective example embodiments. Communication system 200 generally includes two or more devices 102 (represented as host captioning device 220 and client devices 222A, 22B and 222C) and WLAN 104. Though not shown, WLAN 204 may provide connectivity to one or more other networks such as an Intranet or the Internet.

WLAN 204 includes a network which in some examples conforms to IEEE 802.11 standards such as 802.11b, 802.11g, and/or 802.11n. However, other communications protocols may also be used for WLAN 204. WLAN 204 includes one or more wireless RF Access Points (AP) 214 (one of which is shown in FIG. 2) that collectively provide a WLAN coverage area. For the example embodiment depicted in FIG. 2, WLAN 204 is operated by an enterprise (for example, a business or institution (e.g. university) in a building or campus type environment) and the access points 214 are connected to an access point interface not shown.

Although a particular arrangement with device 102 is shown, the present disclosure contemplates any suitable arrangement. In some example embodiments, access point 214 may reside within captioning device 220. FIG. 2B illustrates an example embodiment of a communication system 250 in which host captioning device 220 includes an access point 214 to establish a wireless network among captioning device 220 and respective client devices 222A-222C.

Persons of ordinary skill in the art will appreciate that additional infrastructure (e.g. servers, gateways, routers, firewalls, etc.) may be employed in addition to the components shown to provide their respective services and that FIGS. 2A and 2B are simplified. It is also understood that a server can include one or more computing devices with programmable controllers, storage devices and software applications therefore (instructions and/or data), typically stored in a computer readable medium such as a memory or other storage device communicatively coupled to the server.

It will be appreciated that the system shown in FIGS. 2A and 2B include but two possible communication networks or configurations of a multitude of possible configurations for use with captioning device 220 and client device 222.

FIGS. 3A and 3B are flowcharts showing methods for communicating and presenting the live text of a presenter's speech to an audience member through the use of captioning device 220 and client device (e.g. 222A) of FIG. 2A or 2B.

At 302, captioning device 220 is configured to accept communications via a network. Captioning device 220 either connects to an existing network, or alternatively provides a local area network and serves as an access point.

At 304, captioning device 220 receives a registration message from client device 222. In SIP-enabled devices, the registration message may be a REGISTER request.

At 306, captioning device 220 sends an invitation message to registered client device 222 to establish a session between the two devices. Persons of ordinary skill in the art will appreciate that captioning device 220 may be configured in various ways in regards to the timing of the sending of the invitation. For example, captioning device 220 may be configured to send the invitation message automatically in response to the registration message received from client device 222. Alternatively, in situations where client devices register before the live presentation begins, captioning device 220 may delay sending invitations until shortly or immediately before the live presentation commences. A delay in establishing the session may provide advantages, such as the conservation of network and device resources. Moreover, client device 222 may be configured to present an alert to a user (e.g. that the live presentation is about to start) in response to receiving a delayed invitation message.

In a SIP-enabled scenario, captioning device 220 sends an INVITE message requesting client device 222 the establishment of a session between the two devices. Although not shown, captioning device 220 receives from client device 222 an affirmative response (SIP 2xx) or a failure response (SIP 4xx). Upon receiving the response, captioning device 220 may acknowledge the response with an ACK message. At this point, where the response is affirmative, an RTP channel may be established between client device 222 and captioning device 220.

At 308, captioning device 220 transmits caption information to client device 222 via the established real-time text session.

At the end of the presentation, captioning device 220 may terminate the session. Although not shown, in a SIP-enabled scenario, captioning device 220 may send a BYE message to client device 222. Alternatively, captioning device 220 may receive a BYE message from captioning device 220 at any time to terminate the session.

At 322, client device 222 is configured with the information needed for sending the registration request. The presenter of the live presentation may provide audience members with the necessary configuration information, such as the IP address or network name of captioning device 220. Audience members may enter such information member into client device 222 using keyboard or keypad 154. Alternatively, client device 222 may provide a list of available network names from which an audience member may select the network name corresponding to the network of captioning device 220.

At 324, client device 222 sends a registration message to captioning device 220. In SIP-enabled devices, the registration message may be a REGISTER request.

At 326, client device 222 receives an invitation message from captioning device 220 to establish a session between the two devices. In a SIP-enabled scenario, client device 222 receives an INVITE request from captioning device 22 for establishing a session between the two devices. Although not shown, client device 222 provides an affirmative response (SIP 2xx) or a failure response (SIP 4xx). The client device may receive an ACK message from captioning device 220 as an acknowledgement of the response. At this point, where the response is affirmative, an RTP channel may be established between client device 222 and captioning device 220.

At 328, client device 222 receives caption information from captioning device 220 via the established real-time text session.

At 330, client device 222 presents the received text to an audience member on for example a display 142 or an auxiliary I/O subsystem 150 of client device 222.

Audience members may gracefully disconnect client device 222 from captioning device 220 at any time to stop receiving the captions. Alternatively, at the end of the presentation, captioning device 220 may terminate the session. Although not shown, in a SIP-enabled scenario, client device 222 may send a BYE message to captioning device 220, or client device 222 may receive a BYE message from captioning device 220.

Although not shown, other requests and responses including SIP ACK, BYE and status messages may be communicated between client device 222 and captioning device 220.

One or more embodiments have been described by way of example. It will be apparent to persons skilled in the art that a number of variations and modifications can be made without departing from the scope of what is defined in the claims.

In some example embodiments, captioning device (220) receives the speech of a person translating the live presentation, as opposed to directly receiving the speech of the presenter.

FIGS. 3A and 3B are flowcharts showing methods for communicating a presenter's live speech to audience members using captioning and client devices, in accordance with example embodiments of the present disclosure. Some of the steps illustrated in the flowchart may be performed in an order other than that which is described. Also, it should be appreciated that not all of the steps described in the flow charts are required to be performed, that additional steps may be added, and that some of the illustrated steps may be substituted with other steps.

What is claimed is:

1. A method at a captioning device for communicating caption information to a client device, comprising:
   receiving a registration message from the client device;
   waiting until a presentation begins;
   upon the presentation beginning, sending, from the captioning device, an invitation to the client device for establishing a communication session in response to the received registration message;
   receiving an audio signal related to the presentation through a microphone at the captioning device or connected to an audio port of the captioning device; and
   sending, from the captioning device, caption information comprising text based on the received audio signal to the client device via the communication session;
   wherein the client device is prevented from transmitting data to the captioning device after the beginning of the presentation; and
   wherein the captioning device operates as an access point for establishing a wireless network among the captioning device and one or more other devices, including the client device, for the sending of caption information.

2. The method of claim 1 wherein the sending of the caption information to the client device is in real time.

3. The method of claim 1 wherein:
   the registration message comprises a Session Initiation Protocol (SIP) REGISTER request and the invitation comprises a SIP INVITE request for establishing a SIP session in response to the received SIP REGISTER request.

4. The method of claim 1 further comprising:
converting the received audio signal to text for sending to the client device.

5. The method of claim 1 wherein the invitation to the client device is automatically sent on registration of the client device.

6. A captioning device for providing caption information to a client device, comprising:
a microphone or an audio port connected to a microphone to receive an audio signal; and
a communications module to:
receive a registration message from the client device;
wait until a presentation begins;
upon the presentation beginning, send an invitation to the client device for establishing a communication session in response to the received registration message; and
send caption information comprising text based on the received audio signal to the client device via the communication session;
wherein the audio signal relates to the presentation;
wherein the client device is prevented from transmitting data to the captioning device after the beginning of the presentation; and
wherein the captioning device operates as an access point for establishing a wireless network among the captioning device and one or more other devices, including the client device, for the sending of caption information.

7. The captioning device of claim 6 further configured to:
send the caption information to the client device in real time.

8. The captioning device of claim 6 wherein:
the registration message comprises a Session Initiation Protocol (SIP) REGISTER request and the invitation comprises a SIP INVITE request for establishing a SIP session in response to the received SIP REGISTER request.

9. The captioning device of claim 6 further configured to:
convert the received audio signal to text for sending to the client device.

10. The captioning device of claim 6 wherein the invitation to the client device is automatically sent on registration of the client device.

11. A method at a client device for receiving caption information from a captioning device, comprising:
sending a registration message to the captioning device;
receiving, at the client device, an invitation message from the captioning device for establishing a communication session in response to the sent registration message upon a presentation beginning; and
receiving, from the captioning device via the communication session, the caption information comprising text based on an audio signal received through a microphone at the captioning device or connected to an audio port of the captioning device wherein the audio signal relates to the presentation;
wherein the client device is prevented from transmitting data to the captioning device after the beginning of the presentation;
wherein the captioning device operates as an access point for establishing a wireless network among the captioning device and one or more other devices, including the client device, for the sending of caption information.

12. The method of claim 11 further comprising:
receiving the caption information from the captioning device in real time.

13. The method of claim 11 wherein:
the registration message comprises a Session Initiation Protocol (SIP) REGISTER request and the invitation comprises a SIP INVITE request for establishing a SIP session in response to the sent SIP REGISTER request.

14. The method of claim 11 further comprising:
presenting the caption information received from the captioning device.

15. The method of claim 11, further comprising:
receiving, through a user interface at the client device, information identifying the captioning device to allow the sending of the registration message to the captioning device.

16. A client device for receiving caption information from a captioning device, comprising:
a communications module to:
send a registration message to the captioning device;
receive an invitation from the captioning device for establishing a communication session in response to the sent registration message upon a presentation beginning; and
receive, from the captioning device via the communication session, the caption information comprising text based on an audio signal received through a microphone at the captioning device or connected to an audio port of the captioning device;
wherein the audio signal relates to the presentation;
wherein the client device is prevented from transmitting data to the captioning device after the beginning of the presentation;
wherein the captioning device operates as an access point for establishing a wireless network among the captioning device and one or more other devices, including the client device, for the sending of caption information.

17. The client device of claim 16 further configured to:
receive caption information from the captioning device in real time.

18. The client device of claim 16 wherein:
the registration message comprises a Session Initiation Protocol (SIP) REGISTER request and the invitation comprises a SIP INVITE request for establishing a SIP session in response to the sent SIP REGISTER request.

* * * * *